(12) United States Patent
Sato

(10) Patent No.: US 11,475,866 B2
(45) Date of Patent: Oct. 18, 2022

(54) HEAD-MOUNTED DISPLAY APPARATUS, INPUT METHOD SWITCHING METHOD, AND INPUT METHOD SWITCHING PROGRAM

(71) Applicant: SEIKO EPSON CORPORATION, Tokyo (JP)

(72) Inventor: Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 48 days.

(21) Appl. No.: 17/092,311

(22) Filed: Nov. 8, 2020

(65) Prior Publication Data

US 2021/0142766 A1 May 13, 2021

(30) Foreign Application Priority Data

Nov. 13, 2019 (JP) .............................. JP2019-205326

(51) Int. Cl.
| G09G 5/373 | (2006.01) |
| H04R 1/08 | (2006.01) |
| G10L 15/22 | (2006.01) |
| G10L 25/51 | (2013.01) |
| G09G 5/38 | (2006.01) |
| G06F 3/01 | (2006.01) |

(52) U.S. Cl.
CPC ............ G09G 5/373 (2013.01); G06F 3/012 (2013.01); G09G 5/38 (2013.01); G10L 15/22 (2013.01); G10L 25/51 (2013.01); H04R 1/08 (2013.01); *G09G 2354/00* (2013.01); *G10L 2015/223* (2013.01); *H04R 2499/15* (2013.01)

(58) Field of Classification Search
CPC ...... G09G 5/373; G09G 5/38; G09G 2354/00; G09G 2340/0464; G09G 3/001; G06F 3/012; G06F 3/013; G06F 3/011; G06F 3/167; G06F 3/165; G10L 15/22; G10L 25/51; G10L 2015/223; H04R 1/08; H04R 2499/15
See application file for complete search history.

(56) References Cited

U.S. PATENT DOCUMENTS

| 2018/0356636 | A1 | 12/2018 | Kimura et al. | |
| 2021/0116991 | A1* | 4/2021 | Nienstedt | G02B 27/01 |
| 2021/0389587 | A1* | 12/2021 | Tsuruga | G02B 27/017 |

FOREIGN PATENT DOCUMENTS

JP 2017120550 7/2017

* cited by examiner

*Primary Examiner* — Bryan Earles
(74) *Attorney, Agent, or Firm* — JCIPRNET

(57) ABSTRACT

A head-mounted display apparatus includes a display unit configured to display an image overlapping with an external scene, a display control unit configured to control image display on the display unit, a microphone, a first accepting unit configured to accept, by voice recognition of voice input from the microphone, a change of a display state of the image, and a second accepting unit configured to accept, by a method other than the voice recognition, the change of the display state of the image. When acceptance by the first accepting unit is not possible, the display control unit switches to acceptance by the second accepting unit, and changes the display state of the image.

6 Claims, 9 Drawing Sheets

HEAD-MOUNTED DISPLAY APPARATUS, INPUT METHOD SWITCHING METHOD, AND INPUT METHOD SWITCHING PROGRAM

The present application is based on, and claims priority from JP Application Serial Number 2019-205326, filed Nov. 13, 2019, the disclosure of which is hereby incorporated by reference herein in its entirety.

BACKGROUND

1. Technical Field

The present disclosure relates to a head-mounted display apparatus, an input method switching method, and an input method switching program.

2. Related Art

JP-A-2017-120550 discloses a method in which input methods that can be employed in accordance with an activity state of a wearer, such as standing still, walking, and running are prepared in advance, and when the activity state of the wearer changes, the input method is dynamically switched.

However, even if the input method that has been prepared in advance in accordance with the activity state of the wearer is employed, there is a case in which the switched input method is not appropriate and cannot be used, depending on the surrounding environment. For example, even when an input is prepared using a voice input method, depending on the surrounding environment, such as if ambient sound or noise is large, or the like, it may not be possible to use the voice input or it may be difficult to use the voice input.

SUMMARY

According to an embodiment of the present disclosure, a head-mounted display apparatus is provided. The head-mounted display apparatus includes a display unit configured to display an image overlapping with an external scene, a display control unit configured to control image display on the display unit, a microphone, a first accepting unit configured to accept, by voice recognition of voice input from the microphone, a change of a display state of the image, and a second accepting unit configured to accept, by a method other than the voice recognition, the change of the display state of the image. When acceptance by the first accepting unit is not possible, the display control unit switches to acceptance by the second accepting unit, and changes the display state of the image.

DESCRIPTION OF EXEMPLARY EMBODIMENTS

Embodiments

Figure 1:
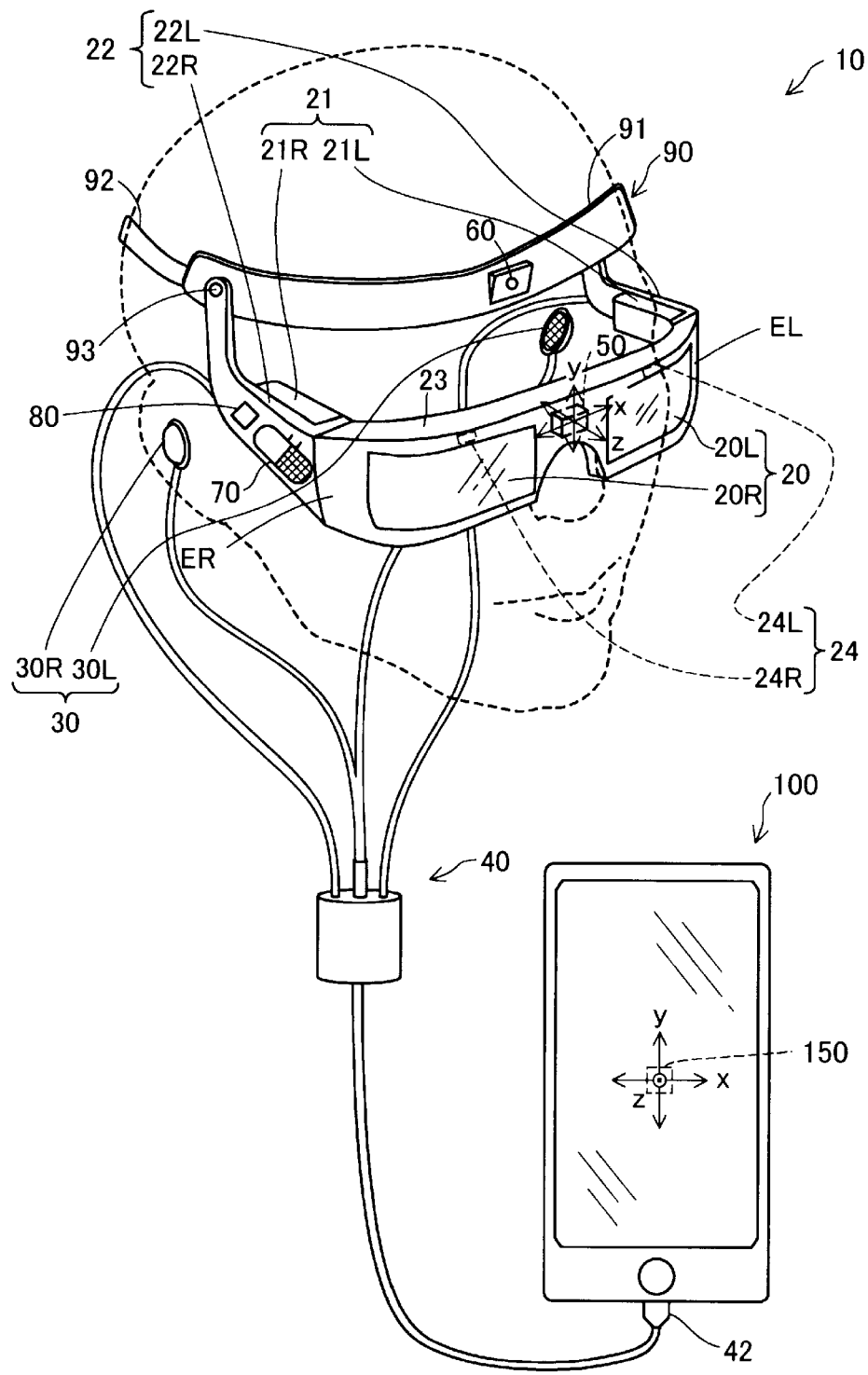
FIG. 1 is an explanatory diagram illustrating a schematic configuration of a head-mounted display apparatus.

FIG. 1 is an explanatory diagram illustrating a schematic configuration of a head-mounted display apparatus (head-mounted display) 10 (hereinafter abbreviated to "HMD 10"). The HMD 10 of a present embodiment is a transparent type HMD. In other words, the HMD 10 can cause the wearer to perceive a virtual image while also causing light coming from an external scene (scene) including an object to be directly visible.

The HMD 10 includes a display unit 20 that displays an image, earphones 30, a cable 40, a camera 60, a microphone 70, a touch sensor 80, a mounting band 90 mountable on the head of a wearer, and a controller 100 that controls the display unit 20. The display unit 20 displays a document transmitted from the controller 100 as a virtual image, in a state of being mounted on the head of the wearer. Note that the document is an example, and the display unit 20 may take a displayed object other than the document, such as a photo, video, or the like, as an object of display. Hereinafter, the "document" is referred to that includes the photo, video, and the like.

The mounting band 90 is provided with a resin mounting base 91, a cloth belt 92 coupled to the mounting base 91, and the camera 60. The mounting base 91 has a shape that curves along the shape of the front of the head of a person. The belt 92 is mounted around the head of the wearer.

The camera 60 is able to capture the external scene, and is disposed in a central portion of the mounting base 91. In other words, when the mounting band 90 is mounted on the head of the wearer, the camera 60 is disposed in a position corresponding to the center of the forehead of the wearer. Therefore, when the mounting band 90 is mounted on the head of the wearer, the camera 60 captures the external scene, which is the external scenery in the direction of the line-of-sight of the wearer, and acquires a captured image, which the image that has been captured. Note that the camera 60 may be provided in a frame 23 to be described later.

The display unit 20 includes a display drive unit 21 and a holding unit 22, and is coupled to the mounting base 91 of the mounting belt 90. The display unit 20 is a spectacles-like unit. Thus, the display unit 20 includes a right display unit 20R and a left display unit 20L. In a similar manner, the display drive unit 21 and the holding unit 22 also include a right display drive unit 21R, a left display drive unit 21L, a right holding unit 22R, and a left holding unit 22L.

The right display unit 20R and the left display unit 20L are respectively incorporated into the left and right sides of the frame 23, and are positioned in front of the right and left eyes of the wearer when the wearer is wearing the display unit 20. The right display unit 20R and the left display unit 20L are coupled to each other at respective end portions on the center side.

An inertial sensor 50 (inertial measurement unit 50, hereinafter referred to as the "IMU 50") is provided in the center of the frame 23. The IMU 50 is a six degrees of freedom inertial measurement device. The IMU 50 includes a 3-axis acceleration sensor in directions of an x-axis, a y-axis, and a z-axis, and a 3-axis gyro sensor, and acquires six degrees of freedom (6DoF) information about the HMD 10. The 6DoF is the freedom of movement, and includes movement in the x-axis, the y-axis, and the z-axis directions, and rotational movement about the x-axis, the y-axis, and the z-axis. In the present embodiment, the left-right direction of the frame 23 is the x-axis direction, the up-down direction of the frame 23 is the y-axis direction, and the normal direction of the frame 23 is the z-axis direction.

A line-of-sight sensor 24 that detects the line-of-sight of the wearer is provided on the inner side of the frame 23, that is, on the head side of the wearer. The line-of-sight sensor 24 recognizes the position of the pupil of the wearer and senses the direction of the line-of-sight of the wearer. As the line-of-sight sensor 24, the HMD 10 includes a right line-of-sight sensor 24R for the right eye and a left line-of-sight sensor 24L for the left eye.

The right holding unit 22R extends in a substantially horizontal direction from an end ER of the right display unit 20R, has a shape that is inclined obliquely upward from the middle thereof, and forms a connection between the end ER and a coupling portion 93 on the right side of the mounting base 91. Similarly, the left holding unit 22L extends in a substantially horizontal direction from an end EL of the left display unit 20L, has a shape that is inclined obliquely upward from the middle thereof, and forms a connection between the end EL and a coupling portion (not illustrated) on the left side of the mounting base 91. Each of the coupling portions 93 couples the right holding unit 22R and the left holding unit 22L such that the right holding unit 22R and the left holding unit 22L can rotate about the coupling portion 93 and can be fixed at a desired rotation position. As a result, the display unit 20 is provided so as to be rotatable with respect to the mounting base 91.

The microphone 70 and the touch sensor 80 are provided in the right holding unit 22R. The microphone 70 collects the voice of the wearer. The microphone 70 preferably has directionality so that only the sound of the wearer can be collected. However, the microphone 70 need not necessarily have directionality. The microphone 70 and the touch sensor 80 may be disposed elsewhere on the HMD 10. A microphone may be provided in the controller 100.

The right display drive unit 21R and the left display drive unit 21L are respectively disposed on the inner side of the right holding unit 22R and of the left holding unit 22L that are portions corresponding to temples of the display unit 20.

As the earphones 30, the HMD 10 is provided with a right earphone 30R worn in the right ear of the wearer and a left earphone 30L worn in the left ear.

The display drive unit 21, the earphones 30, the inertial sensor 50, the camera 60, the microphone 70, and the touch sensor 80 are coupled to the controller 100 by the cable 40. The cable 40 supplies power from the controller 100 to the HMD 10 and also exchanges information between the HMD 10 and controller 100. A connector 42 is provided at a leading end of the cable 40. The cable 40 is coupled to the controller 100 using the connector 42. The controller 100 is, for example, a smart phone. Note that the controller 100 may be a dedicated controller. The controller 100 recognizes an operation target object from the image captured by the camera 60, and displays, on the display unit 20, a virtual image in which the document is enlarged or reduced as necessary, in a screen position avoiding the operation target object.

Figure 2:
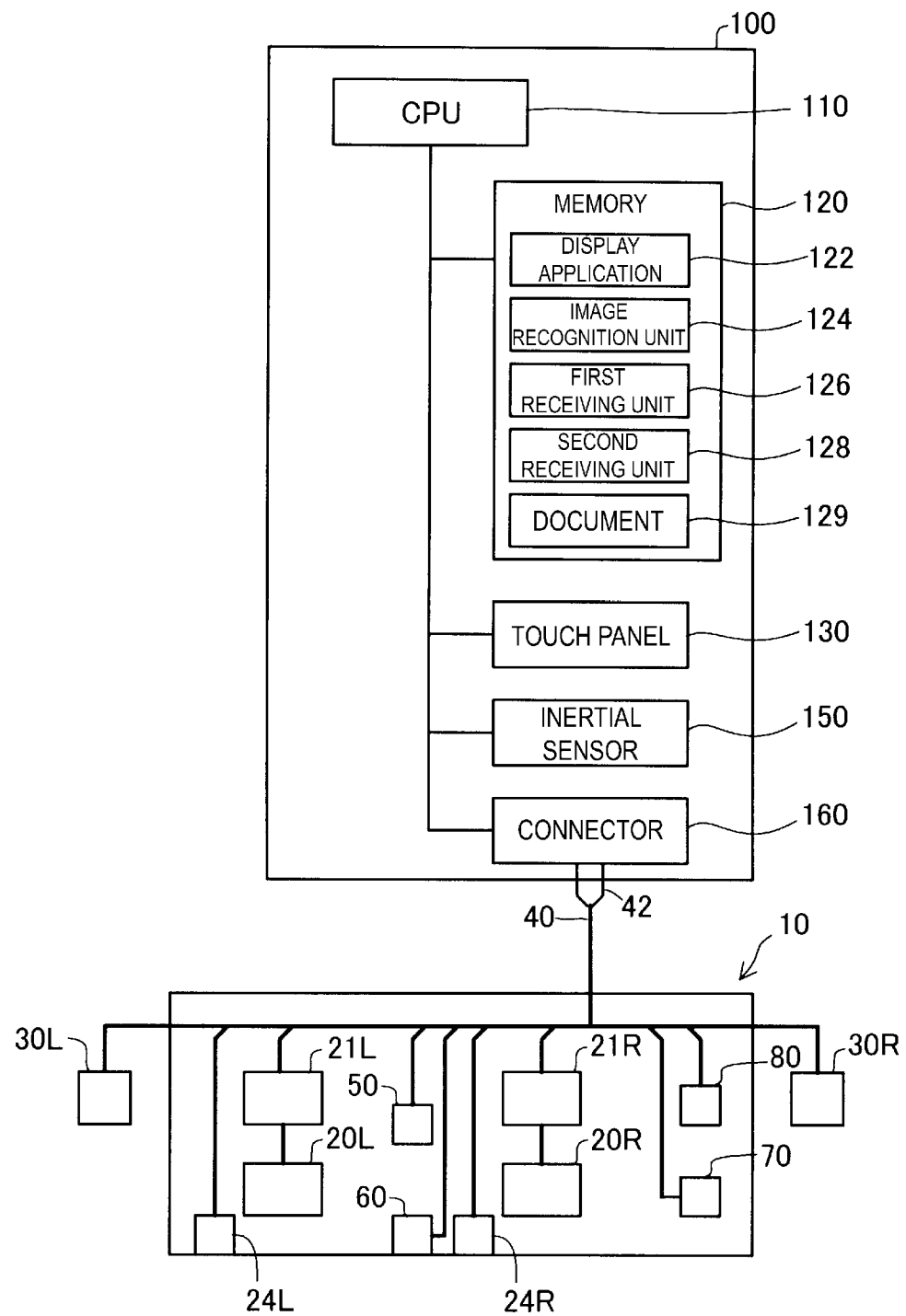
FIG. 2 is a block diagram of a controller and the HMD.

FIG. 2 is a block diagram of the controller 100 and the HMD 10. As described above, the controller 100 is the smart phone, and includes a CPU 110, a memory 120, a touch panel 130, an inertial sensor 150, and a connector 160.

A display application 122 that is a computer program, an image recognition unit 124, a first accepting unit 126, a second accepting unit 128, and a document 129 are stored in the memory 120. The image recognition unit 124 recognizes the operation target object from the image captured by the camera 60. The display application 122 determines where an image of the document 129 is to be displayed on the display unit 20 and at what size, and transmits the image of the document 129 to the HMD 10. At this time, by being executed by the CPU 110, the display application 122 functions as a display control unit that controls the display of the image on the display unit 20 and displays the image of the document 129 at a desired position on the display 20, that is, at a position at which the image of the document 129 does not overlap with the operation target object. The first accepting unit 126 analyzes the voice input to the microphone 70, and recognizes an instruction from the wearer. In other words, the first accepting unit 126 functions as a voice recognition unit. The acceptance method by the first accepting unit 126 is referred to as a "first input method". Further, the first accepting unit 126 may be configured as a cloud-type voice recognition unit. The second accepting unit 128 accepts changes in a display state of the image by a method than the voice recognition. Specifically, the second accepting unit 128 accepts a movement of the head obtained from the IMU 50, a movement of the controller 100 obtained from the IMU 150, a movement of the line-of-sight of the wearer obtained from the line-of-sight sensor 24, and an input on the touch panel 130, which will be described later. The acceptance method by the second accepting unit 128 is referred to as a "second input method". The document 129 is the document displayed on the display unit 20.

The touch panel 130 is both an input device and an output device of the controller 100. The inertial sensor 150 (hereinafter abbreviated as the "IMU 150") is a six degrees of freedom inertial measurement device. The IMU 150 includes a 3-axis (x-axis, y-axis, and z-axis) acceleration sensor, and a gyro sensor about three axes (about the x-axis, about the y-axis, and about the z-axis), and acquires six degrees of freedom (6DoF) of the controller 100. In the present embodiment, the left-right direction of the controller 100 is the x-axis direction, the up-down direction is the y-axis direction, and the front-rear direction is the z-axis direction.

The connector 42 of the cable 40 is coupled to the connector 160. The right display drive unit 21R, the left display drive unit 21L, the right line-of-sight sensor 24R, the left line-of-sight sensor 24L, the IMU 50, the camera 60, the microphone 70, the touch sensor 80, the right earphone 30R, and the left earphone 30L are coupled to the cable 40. In other words, the controller 100 transmits the document 129 to the HMD 10 via the connector 42 coupled to the connector 160 and the cable 40, and displays the document 129 on the display unit 20. After that, if there is an instruction from the wearer, the display position and the size of the document 129 on the display unit 20 are changed. The instruction from the wearer to the HMD 10 is communicated to the controller 100 via the cable 40.

Figure 3A:
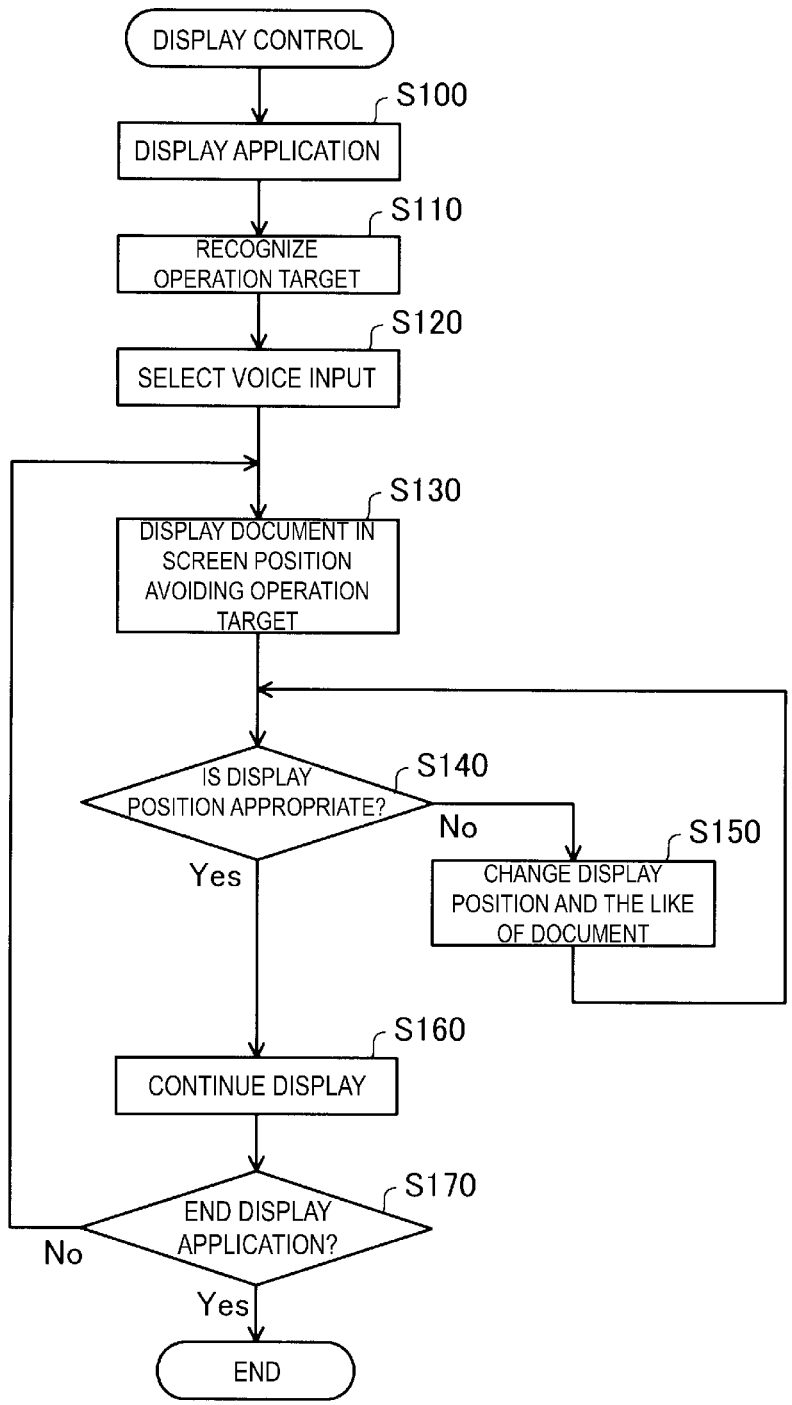
FIG. 3A is a display control flowchart executed by a CPU of the controller.

FIG. 3A is a display control flowchart executed by the CPU 110 of the controller 100. At step S100, when the wearer detects that the display application 122 has been activated, the CPU 110 moves the processing to step S110.

At step S110, the CPU 110 acquires the image captured by the camera 60 of the HMD 10, and recognizes the operation target object in the image. At step S120, the CPU 110 selects acceptance by the first accepting unit 126, that is, via voice input. At step S130, the CPU 110 displays the image of the document 129 in a position avoiding the operation target object recognized at step S110, that is, in a position that does not overlap with the operation target object. At this time, the CPU 110 may enlarge or reduce the image as necessary.

At step S140, the CPU 110 accepts a determination, from the wearer, as to whether or not the display position and the size of the document 129 (illustrated as a "display position and the like" in FIG. 3A) is appropriate. This is because the CPU 110 is unable to determine whether or not the display position and the size of the document 129 is appropriate.

Figure 3B:
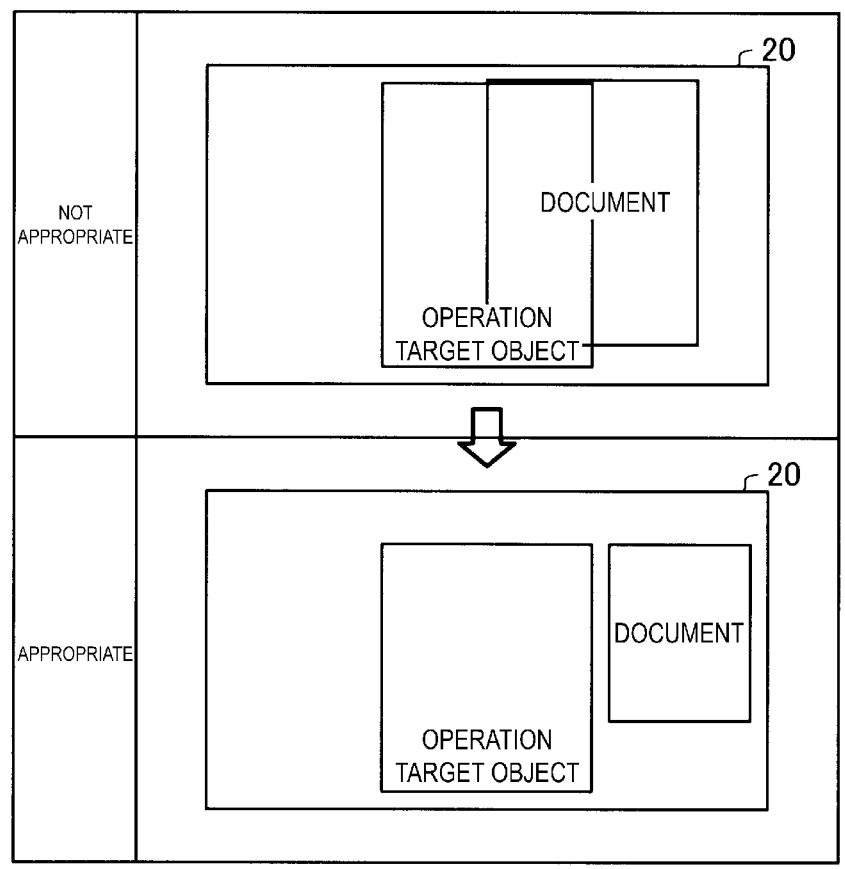
FIG. 3B is an explanatory diagram illustrating an inappropriate example and an appropriate example of a display position and size of a document.

FIG. 3B is an explanatory diagram illustrating an inappropriate example and an appropriate example of the display position and the size of the document. As described above, at step S130, the CPU 110 displays the image of the document 129 at the position avoiding the operation target object recognized at step S110, that is, in the position that does not overlap with the operation target object. However, as illustrated in the top view in FIG. 3B, the operation target object and the image of the document 129 may overlap. In this case, by an instruction from the wearer, the display position and the size of the document 129 are changed as illustrated in the bottom view in FIG. 3B.

At step S140, if the wearer determines that the display is "appropriate", the CPU 110 moves the processing to step S160 and continues the display. Note that, if there is no action from the wearer, the CPU 110 may determine that the display is appropriate. On the other hand, if the wearer determines that the display is "not appropriate", then the CPU 110 moves the processing to step S150. For example, when the wearer determines that the display is "not appropriate", the wearer instructs the CPU 110, using voice, to move the processing to step S150. Note that when the voice instruction is not possible, the wearer may input the "not appropriate" determination to the CPU 110 and instruct the processing to be moved to step S150 by touching a predetermined icon on the touch panel 130 of the controller 100, or by touching the touch sensor 80 of the HMD 10.

At step S150, the CPU 110 accepts the instruction from the wearer and changes the display position and the size of the document 129 on the display unit 20. After that, the CPU 110 moves the processing to step S140. The input method by which the CPU 110 accepts the instruction from the wearer is described below.

When the display is continued because the display position and the like is appropriate (step S160), next, at step S170, a determination is made as to whether to end the display application 122, and when an instruction to end the display application 122 is received from the wearer, the CPU 110 ends the processing illustrated by the flowchart. On the other hand, for as long as the instruction to end the display application 122 is not received from the wearer, the CPU 110 returns the processing to step S160 and continues the display of the document 129.

Figure 4:
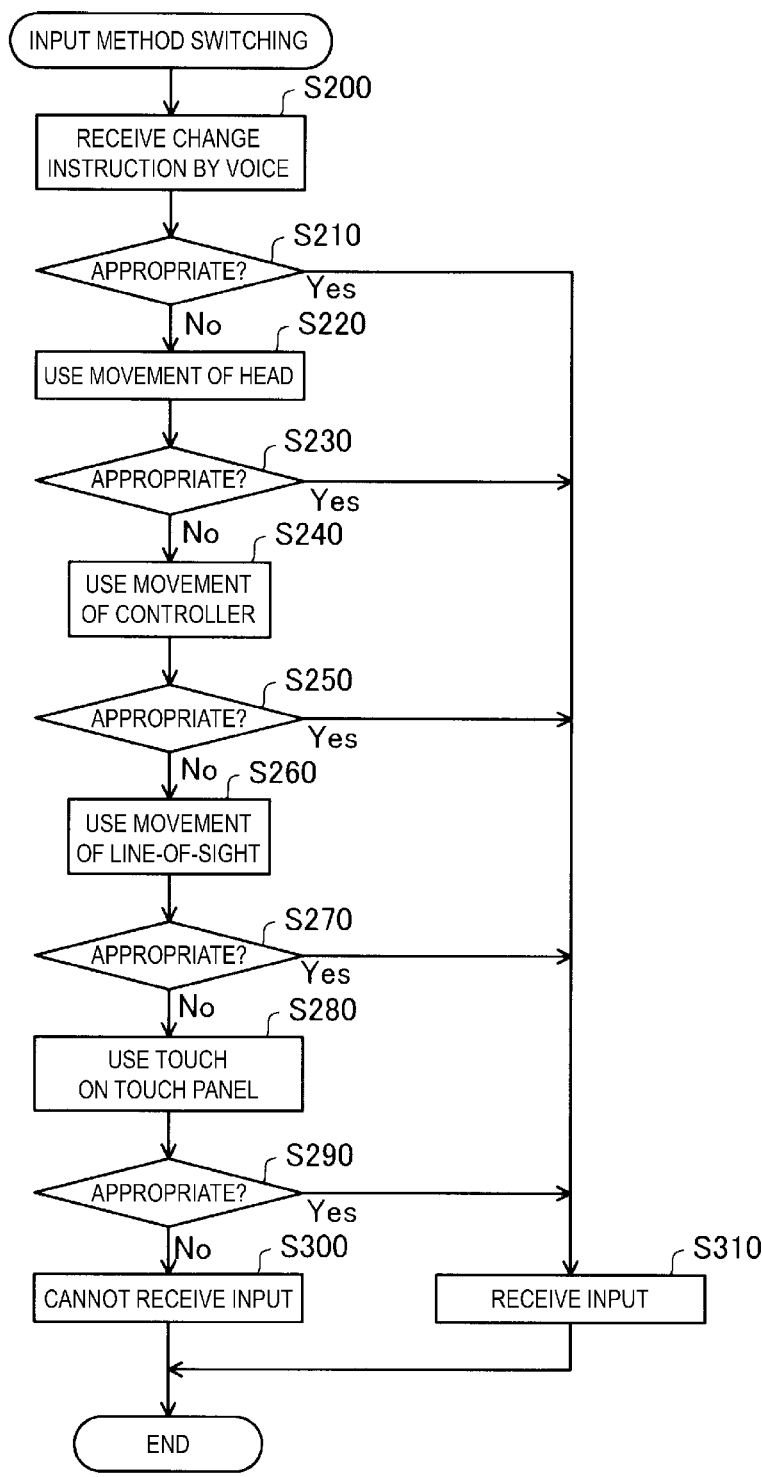
FIG. 4 is a switching flowchart of an input method executed by the CPU.

At step S150 in FIG. 3A, the CPU 110 accepts an instruction from the wearer to change the display position or the like. FIG. 4 is a switching flowchart of an input method executed by the CPU 110 when the instruction is received from the wearer to change the display position or the like. At step S200, the CPU 110 accepts a change instruction, by voice using the first accepting unit 126. Note that the input method for receiving the change by the voice using the first accepting unit 126 is a default input method.

At step S210, the CPU 110 determines whether the voice input method is appropriate. When the voice input method is appropriate, the CPU 110 moves the processing to step S310, and when the voice input method is not appropriate, the CPU 110 moves the processing to step S220.

At step S210, the case in which the voice input method is appropriate is a case in which the display position and the size of the image on the display unit 20 have been changed in accordance with the voice instruction of the wearer. On the other hand, the case in which the voice input method by the voice is not appropriate includes (1) a case in which it is determined that the voice input method is not appropriate because it is difficult or not possible for the CPU 110 to input the instruction of the wearer by voice, and (2) a case in which the wearer determines that the voice input method is not appropriate. Specifically, the CPU 110 determines that the input method by voice is not appropriate when the ambient noise level is greater than or equal to a threshold value, such as 60 dB or higher, for example. Further, even when the ambient noise level is less than the threshold value, the CPU 110 may determine that the input method by voice is not appropriate in a case in which two or more sound sources are input to the microphone 70, and a case in which, due to a frequency or the like of the voice input to the microphone 70, a voice other than that of the wearer is input. Furthermore, the CPU 110 may also determine that the input method of the instruction by the voice of the wearer is not appropriate when the voice recognition is the cloud-type and connection to a network is not possible.

The case in which the wearer determines that the display position is not appropriate includes, for example, a case in which the display position and the size of the image on the display unit 20 have not been changed in accordance with the instruction by voice of the wearer, and a case in which, in an environment in which the wearer is currently present, the wearer has determined that the input method by voice is not appropriate. Note that the CPU 110 cannot make these determinations. Thus, the wearer notifies the CPU 100, by an input method other than the voice, that the input method by voice is not appropriate. For example, by the input method using the movement of the head, by the input method using the movement of the controller 100, by the input method using the input on the touch panel 130 of the controller 100, or by touching the touch sensor 80 of the HMD 10, for example, the wearer can notify the CPU 110 that the input method by voice is not appropriate.

At step S220, the CPU 110 switches the input method to the input method using the movement of the head, which is the input method using the second accepting unit 128 of the wearer of the HMD 10. At step S230, the CPU 110 determines whether or not the input method using the movement of the head of the wearer is appropriate. If the input method using the movement of the head is appropriate, then the processing moves to step S310, and if the input method using the movement of the head is not appropriate, the processing moves to step S240.

When, at step S230, the input method using the movement of the head is not appropriate, this includes (3) a case in which it is determined that the method using the movement of the head is not appropriate because it is difficult or not possible for the CPU 110 to receive the input using the movement of the head, and (4) a case in which the wearer determines that the input method using the movement of the head is not appropriate. Specifically, the CPU 110 analyzes the image captured by the camera 60 and determines that the input method using the movement of the head is not appropriate when the wearer is not in an environment in which it is possible to move his/her head, such as when the head of the wearer is in a narrow space, or when the wearer is in a high location.

The case in which the wearer determines that the input method using the movement of the head is not appropriate includes, for example, a case in which the display position and the size of the image on the display unit 20 have not been changed in accordance with the instruction by the movement of the head of the wearer, and a case in which the wearer has determined that the input method using the movement of the head is not appropriate. Note that the CPU 110 cannot make these determinations. Thus, using an input method other than the voice input method and the input method using the movement of the head, the wearer notifies the CPU 110 that the input method using the movement of the head is not appropriate. For example, by the input method using the movement of the controller 100, by the input method using the movement of the line-of-sight, by the input method using the input on the touch panel 130 of the controller 100, or by touching the touch sensor 80 of the HMD 10, the wearer may notify the CPU 110 that, in addition to the input method by voice, the input method using the movement of the head is also not appropriate.

At step S240, the CPU 110 switches to the input method using the movement of the controller 100, which is the input method using the second accepting unit 128. At step S250, the CPU 110 determines whether or not the input method using the movement of the controller 100 is appropriate. If the input method using the movement of the controller 100 is appropriate, then the processing moves to step S310, and if the input method using the movement of the controller 100 is not appropriate, the processing moves to step S260.

When, at step S250, the input method using the movement of the controller 100 is not appropriate, this includes (5) a case in which it is determined that the method using the movement of the controller 100 is not appropriate because it is difficult or not possible for the CPU 110 to receive the input using the movement of the controller 100, and (6) a case in which the wearer determines that the input method using the movement of the controller 100 is not appropriate. Specifically, the CPU 110 analyzes the image captured by the camera 60, and determines that the input method using the movement of the controller 100 is not appropriate when the input method using the movement of the controller 100 is difficult or not possible because both hands of the wearer are occupied by a tool or the like.

The case in which the wearer determines that the input method using the movement of the controller 100 is not appropriate includes, for example, a case in which the display position and the size of the image on the display unit 20 have not been changed in accordance with the instruction by the movement of the controller 100, and a case in which the wearer has determined that the input method using the movement of the controller 100 is not appropriate. Note that the CPU 110 cannot make these determinations. Thus, using an input method other than the voice input method, the input method using the movement of the head, and the input method using the movement of the controller 100, the wearer notifies the CPU 110 that the input method using the movement of the controller 100 is not appropriate. For example, by the input method using the movement of the line-of-sight, by the input method using the input on the touch panel 130 of the controller 100, or by touching the touch sensor 80 of the HMD 10, the wearer may notify the CPU 110 that, in addition to the voice input method and the input method using the movement of the head, the input method using the movement of the controller 100 is also not appropriate.

At step S260, the CPU 110 switches to the input method using the movement of the line-of-sight, which is the input method using the second accepting unit 128. At step S270, the CPU 110 determines whether or not the input method using the movement of the line-of-sight is appropriate. If the input method using the movement of the line-of-sight is appropriate, then the processing moves to step S310, and if the input method using the movement of the line-of-sight is not appropriate, the processing moves to step S280.

When, at step S270, the input method using the movement of the line-of-sight is not appropriate, this includes (7) a case in which it is determined that the input method using the movement of the line-of-sight is not appropriate because it is difficult or not possible for the CPU 110 to receive the input using the movement of the line-of-sight, and (8) a case in which the wearer determines that the input method using the movement of the line-of-sight is not appropriate. Specifically, the CPU 110 uses the line-of-sight sensor 24 to recognize the pupil of the wearer and detect the line-of-sight, but when the pupil of the wearer cannot be recognized, since the input method using the movement of the line-of-sight is difficult or not possible, the CPU 110 determines that the input method using the movement of the line-of-sight is not appropriate.

The case in which the wearer determines that the input method using the movement of the line-of-sight is not appropriate includes, for example, a case in which the display position and the size of the image on the display unit 20 have not been changed in accordance with the instruction by the movement of the line-of-sight, and a case in which the wearer has determined that the input method using the movement of the line-of-sight is not appropriate. Note that the CPU 110 cannot make these determinations. Thus, using an input method other than the voice input method, the input method using the movement of the head, the input method using the movement of the controller 100, and the input method using the movement of the line-of-sight, the wearer notifies the CPU 110 that the input method using the movement of the line-of-sight is not appropriate. For example, by the input method using the input on the touch panel 130 of the controller 100, or by touching the touch sensor 80 of the HMD 10, the wearer may notify the CPU 110 that, in addition to the voice input method, the input method using the movement of the head, and the input method using the movement of the controller 100, the input method using the movement of the line-of-sight is also not appropriate.

At step S280, the CPU 110 switches to the input method using the touch on the touch panel 130, which is the input method using the second accepting unit 128. At step S290, the CPU 110 determines whether or not the input method using the touch on the touch panel 130 is appropriate. If the input method using the touch on the touch panel 130 is appropriate, then the processing moves to step S310, and if the input method using the touch on the touch panel 130 is not appropriate, the processing moves to step S300.

At step S290, the wearer of the HMD 10 determines that the input method using the touch on the touch panel 130 is not appropriate. Thus, using an input method other than the voice input method, the input method using the movement of the head, the input method using the movement of the controller 100, the input method using the movement of the line-of-sight, and the input method using the touch on the touch panel 130, the wearer notifies the CPU 110 that the input method using the touch on the touch panel 130 is not appropriate. For example, by touching the touch sensor 80 of the HMD 10, the wearer may notify the CPU 110 that, in addition to the voice input method, the input method using the movement of the head, the input method using the movement of the controller 100, and the input method using the movement of the line-of-sight, the input method using the touch on the touch controller 130 is also not appropriate.

At step S300, since neither the first accepting unit 126 nor the second accepting unit 128 can be employed, the CPU 110 determines that the display position and the size of the image of the document 129 cannot be changed.

At step S310, the input is received as follows using each of the input methods determined to be appropriate.

(a) Voice Input Method

Figure 5:
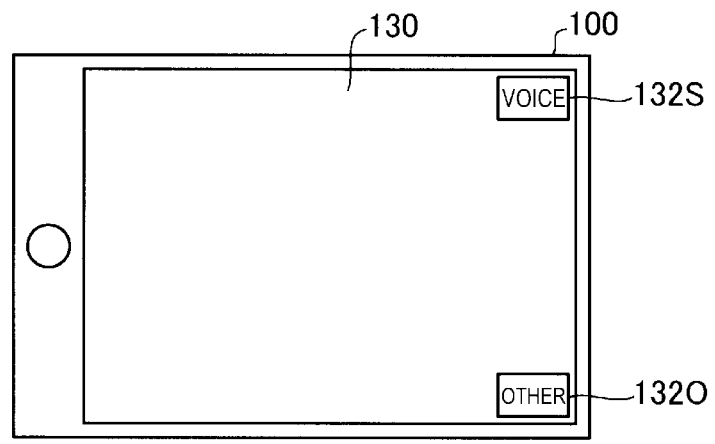
FIG. 5 is an explanatory diagram illustrating a touch panel of the controller when a voice input method is employed.

FIG. 5 is an explanatory diagram illustrating the touch panel of the controller 100 when the voice input method is employed. An icon 132S indicating that the voice input method is being employed is displayed on the touch panel 130. The CPU 110 may display an indication equivalent to that of FIG. 5 on the display unit 20. The CPU 110 uses the first accepting unit 126 to analyze the sound input to the microphone 70, recognize the instruction from the wearer, and change the display position and size of the image in accordance with a recognition result. An icon 132O is an icon for the wearer to input that the voice input method is not appropriate. When the icon 132O is touched, the CPU 110 switches the input method to the input method using the movement of the head. Note that, when the voice input method is employed, the CPU 110 can change a brightness, a color and the like in addition to the display position and size of the image of the document 129.

(b) Input Method Using Movement of Head

Figure 6:
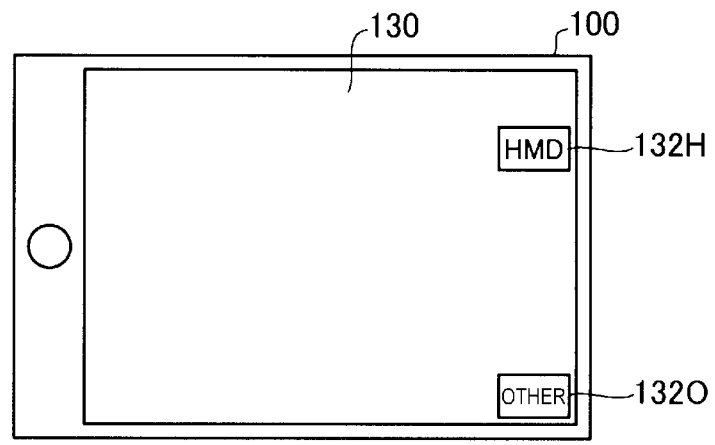
FIG. 6 is an explanatory diagram illustrating the touch panel when an input method using head movement is employed.

FIG. 6 is an explanatory diagram illustrating the touch panel 130 when the input method using the movement of the head is employed. An icon 132H is displayed on the touch panel 130 indicating that the input method using the movement of the head is employed. The CPU 110 may display an indication equivalent to that of FIG. 5 on the display unit 20. The CPU 110 uses the IMU 50 of the HMD 10 to recognize the movement of the head. For example, the CPU 110 can detect that the wearer has shaken his/her head up or down when the rotation around the x-axis of the IMU 50 is detected. If the rotation around the y-axis is detected, it can be detected that the wearer has shaken his/her head to the left or right. Also, if movement along the z-axis is detected, it can be determined that the wearer has moved his/her head to the front or the rear. If the wearer shakes his/her head up and down, or left and right, the CPU 110 moves the display position of the document up, down, and left or right. Further, if the wearer moves his/her head to the front or to the rear, the CPU 110 enlarges or reduces the size of the document.

(c) Input Method Using Movement of Controller 100

Figure 7:
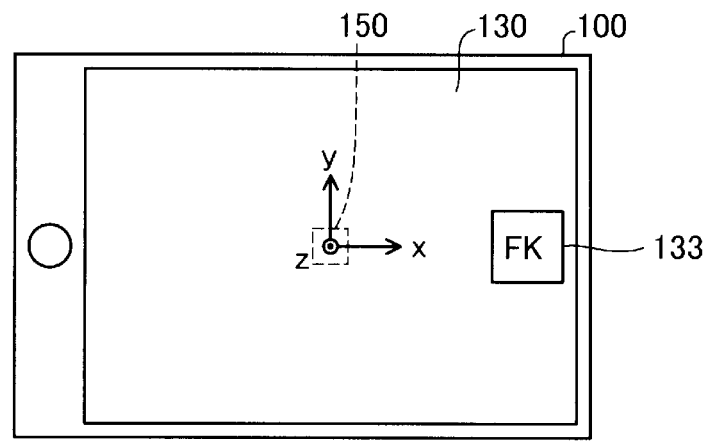
FIG. 7 is an explanatory diagram illustrating the touch panel when an input method using controller movement is employed.

FIG. 7 is an explanatory diagram illustrating the touch panel 130 when the input method using the movement of the controller 100 is employed. A function icon 133 is displayed on the touch panel 130. The CPU 110 detects the movement of the controller 100 when the wearer moves the controller 100 while touching the function icon 133. This is to prevent the detection of movement when the wearer has moved the controller 100 unintentionally. The CPU 110 uses the IMU 150 of controller 100 to recognize the movement of controller 100. For example, when the CPU 110 detects movement along the x-axis of the IMU 150, it can be detected that the wearer has moved the controller 100 to the left or right. When movement along the y-axis is detected, it can be detected that the wearer has moved the controller 100 up or down. Further, when movement along the z-axis direction is detected, it can be determined that the wearer has moved the controller 100 to the front or the rear.

(d) Input Method Using Movement of Line-of-Sight

Figure 8:
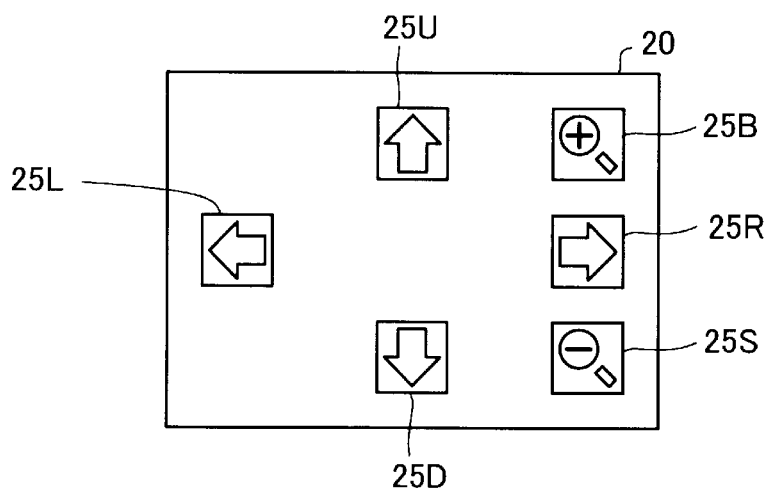
FIG. 8 is an explanatory diagram illustrating a display unit when an input method using line-of-sight movement is employed.

FIG. 8 is an explanatory diagram illustrating the display unit 20 when the input method using the movement of the line-of-sight is employed. On the display unit 20, icons 25U, 25D, 25R, and 25L for moving the document up, down, left, and right, and icons 25B and 25S for enlarging and reducing the document are displayed. The CPU 110 uses the line-of-sight sensor 24 of the HMD 10 to detect which icon the wearer is looking at, detect the line-of-sight of the wearer, and recognize the instruction of the wearer.

(e) Input Method Using Touch on Touch Panel 130

Figure 9:
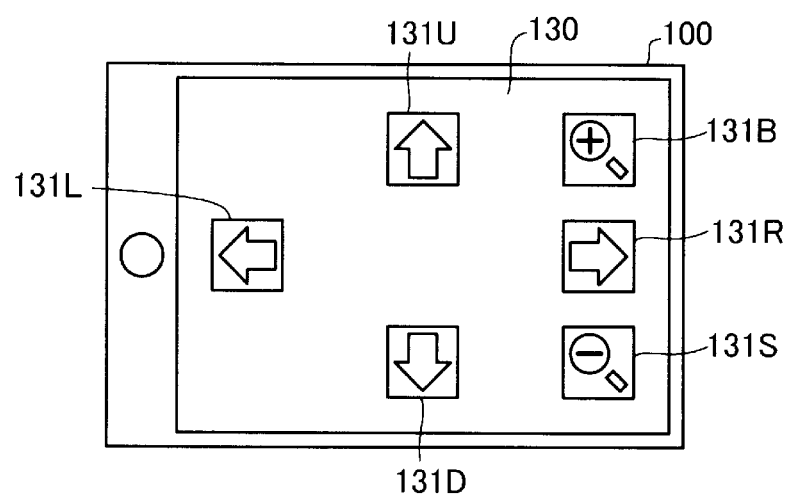
FIG. 9 is an explanatory diagram illustrating the touch panel when an input method using a touch on the touch panel is employed.

FIG. 9 is an explanatory diagram illustrating the touch panel 130 when the input method using the touch on the touch panel 130 is employed. On the touch panel 130, icons 131U, 131D, 131R, and 131L for moving the document up, down, left, and right, and icons 131B and 131S for enlarging and reducing the document are displayed. The CPU 110 detects which icon is touched and recognizes the instruction of the wearer.

As described above, according to the HMD 10 of the present embodiment, when the CPU 110 determines that it is difficult or not possible for the first accepting unit 126 to perform acceptance, that is, to receive the voice input from the microphone 70, the CPU 110 changes the input method for accepting the instruction to change the display position and the like of the document on the display unit 20 to the acceptance by the second accepting unit 128. Thus, switching to the appropriate input method can be easily performed.

In the above-described embodiment, the CPU 110 switches the input method in the order of the voice input method, the input method using the movement of the head, the input method using the movement of the controller 100, the input method using the movement of the line-of-sight, and the input method using the touch on the touch panel 130, but, with respect to the input methods subsequent to the voice input method, the CPU 110 may perform the switching in another order, as long as the order is specified in advance.

In the above-described embodiment, the HMD 10 and the controller 100 need not necessarily include all of the IMU 50, the IMU 150, and the line-of-sight sensor 24, and it is sufficient that the HMD 10 and the controller 100 be provided with at least one of the IMU 50, the IMU 150, and the line-of-sight sensor 24. It is sufficient that the CPU 110 use an input method that uses a configuration with which the CPU 110 is provided.

In the above-described embodiment, when the input method using voice cannot be used, the CPU 110 sequentially displays another of the input methods, on the display unit 20 of the HMD 10 or the touch panel 130 of the controller 100, for example. The CPU 110 may display all of the other input methods for selection on the display unit 20 of the HMD 10 or the touch panel 130 of the controller 100 and cause the wearer to select the input method. When the input method using voice cannot be used, it is possible to switch to the input method using the line-of-sight, for example, without considering the input using the movement of the head. Alternatively, the CPU 110 may give guidance, by voice using the earphones 30, that the input method using voice cannot be used. The HMD 10 and the controller 100 may be equipped with a vibration function, and the CPU 110 may give guidance using vibrations of the vibration function that the input method using voice cannot be used.

In the above description, each of the HMD 10 and an HMD 11 is the transparent type HMD, but may be an HMD that is not optically transparent.

Other Embodiments

In the above-described embodiment, the controller 100 recognizes the operation target object from the image captured by the camera 60 of the HMD 10, and displays the document as the virtual image that is enlarged or reduced as necessary, on the display unit 20 at a screen position avoiding the operation target object. In addition to the case of display control when the image is displayed avoiding the recognized target object, the controller 100 may also be applied to a case in which a position of a display region, of display regions in which the displayed image can be displayed, is changed, or to a case in which the size of the display region is changed.

Figure 10:
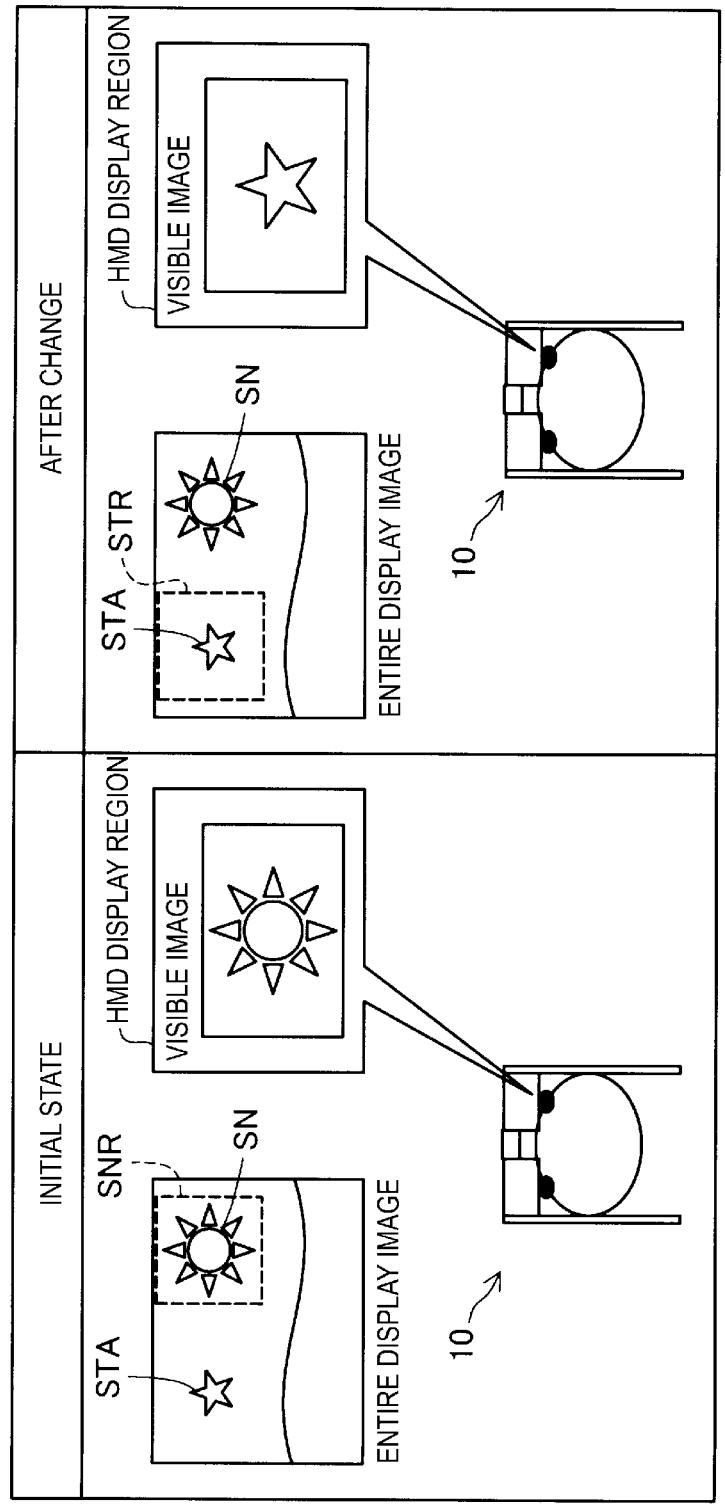
FIG. 10 is an explanatory diagram illustrating another embodiment.

FIG. 10 is an explanatory diagram illustrating another embodiment. In this example, in an initial state, of an entire display image, an image SN illustrating the sun is recognized as a visible image. In the initial state, the display unit 20 of the HMD 10 displays a region SNR of the image SN illustrating the sun. After that, when, by voice recognition or another input method, a change is made to recognize an image STA illustrating a star as the visible image in the entire display image, a region STR of the image STA illustrating the star is displayed on the display unit 20 of the HMD 10. Note that while the example illustrated in FIG. 10 is an example of changing the position of the display region, the size of the display region may also be changed.

The present disclosure is not limited to the embodiments described above, and may be implemented in various aspects without departing from the spirit of the disclosure. For example, the present disclosure may be achieved through the following aspects. Appropriate replacements or combinations may be made to the technical features in the above-described embodiments which correspond to the technical features in the aspects described below to solve some or all of the problems of the disclosure or to achieve some or all of the advantageous effects of the disclosure. Additionally, when the technical features are not described herein as essential technical features, such technical features may be deleted appropriately.

(1) According to an embodiment of the present disclosure, a head-mounted display apparatus is provided. The head-mounted display apparatus is provided. The head-mounted display apparatus includes a display unit configured to display an image overlapping with an external scene, a display control unit configured to control image display on the display unit, a microphone, a first accepting unit configured to accept, by voice recognition of voice input from the microphone, a change of a display state of the image, and a second accepting unit configured to accept, by a method other than the voice recognition, the change of the display state of the image. When acceptance by the first accepting unit is not possible, the display control unit switches to acceptance by the second accepting unit, and changes the display state of the image. According to this embodiment, when a controller determines that the acceptance by the first accepting unit, which accepts the change of the display state of the image through the voice recognition by the voice input from the microphone, is not possible, the controller switches to the acceptance by the second accepting unit, which accepts the change of the display state of the image by a method other than the voice recognition. Thus, switching to an appropriate input method can be easily performed.

(2) In the head-mounted display apparatus according to the above-described embodiment, when a magnitude of noise input to the microphone exceeds a threshold value, the display control unit may determine that the acceptance by the first accepting unit is not possible. According to this configuration, the display control unit can easily determine that the acceptance by the first accepting unit is not possible.

(3) In the head-mounted display apparatus according to the above-described embodiment, when the display control unit detects a specific motion of a wearer of the head-mounted display apparatus, the display control unit may determine that the acceptance by the first accepting unit is not possible. According to this configuration, the display control unit can easily determine that the acceptance by the first accepting unit is not possible.

(4) The head-mounted display apparatus according to the above-described embodiment may include a controller housed in a housing different from the display unit. The second accepting unit may receive an instruction from the wearer, from at least one of a first inertial sensor configured to detect a head movement of the wearer of the head-mounted display apparatus, a second inertial sensor configured to detect a movement of the controller, and a line-of-sight sensor configured to detect a line-of-sight of the wearer of the head-mounted display apparatus. According to this configuration, the appropriate input method can be easily selected.

(5) In the head-mounted display apparatus according to the above-described embodiment, the second accepting unit may receive the instruction from the wearer of the head-mounted display device from at least two of the first inertial sensor, the second inertial sensor, and the line-of-sight sensor, and when the display control unit determines that the acceptance by the first accepting unit is not possible, the display control unit may switch the sensor of the second accepting unit in a predetermined order. According to this configuration, it is possible to switch to the appropriate input method.

(6) In the head-mounted display apparatus according to the above-described embodiment, the display state of the image may include at least one of a display position and a size of the image.

The present disclosure can be embodied in various forms other than the head-mounted display apparatus. For example, the present disclosure can be embodied in a form such as an input method switching method for changing a display on a head-mounted display apparatus, an input method switching program, and a non-transitory storage medium or the like that stores the switching program.

What is claimed is:
1. A head-mounted display apparatus comprising:
a display unit that displays an image overlapping with an external scene;
a display control unit that controls a display state of the image displayed on the display unit;
a microphone that collects a voice;
a first accepting unit that accepts a change of the display state of the image by a voice recognition; and
a second accepting unit that accepts the change of the display state of the image by a method other than the voice recognition, wherein
the first accepting unit is set as a default accepting unit for accepting the change of the display state of the image, and the display control unit switches to accept the change of the display state of the image by the second accepting unit instead of the first accepting unit when a magnitude of noise exceeds a threshold value, when two or more sound sources are collected by the microphone, when a voice other than that of a wearer of the head-mounted display apparatus is collected by the microphone, or when the display control unit detects a specific motion of the wearer.

2. The head-mounted display apparatus according to claim 1, comprising:
a controller housed in a housing different from the display unit, wherein
the second accepting unit accepts an instruction from the wearer of the head-mounted display apparatus, from at least one of a first inertial sensor configured to detect a head movement of the wearer of the head-mounted display apparatus, a second inertial sensor configured to detect a movement of the controller, and a line-of-sight sensor configured to detect a line-of-sight of the wearer of the head-mounted display apparatus.

3. The head-mounted display apparatus according to claim 2, wherein
the second accepting unit accepts an instruction from the wearer of the head-mounted display device from at least two of the first inertial sensor, the second inertial sensor, and the line-of-sight sensor, and
when the second accepting unit is set to accept the change of the display state of the image instead of the first accepting unit, the display control unit switches to accept the change of the display state of the image by the sensors of the second accepting unit in a predetermined order.

4. The head-mounted display apparatus according to claim 1, wherein
the display state of the image includes at least one of a display position and a size of the image.

5. An input method switching method comprising:
displaying an image at a desired position on a display unit, the image overlapping with an external scene;
when changing a display state of the image, accepting a change of the display state of the image by a first input method of voice recognition of voice collected by a microphone, the first input method of voice recognition being set as a default input method, and accepting the change of the display state of the image by a second input method other than the voice recognition when a magnitude of noise exceeds a threshold value, when two or more sound sources are collected by the microphone, when a voice other than that of a recognized user is collected by the microphone, or when a specific motion of the recognized user is detected; and
changing the display state.

6. A non-transitory computer-readable storage medium storing an input method switching program causing a computer to perform functions of:
displaying an image at a desired position on a display unit, the image overlapping with an external scene;
when changing a display state of the image, accepting a change of the display state of the image by a first input method of voice recognition of voice collected by a microphone, the first input method of voice recognition being set as a default input method, and accepting the change of the display state of the image by a second input method other than the voice recognition when a magnitude of noise exceeds a threshold value, when two or more sound sources are collected by the microphone, when a voice other than that of a recognized user is collected by the microphone, or when a specific motion of the recognized user is detected; and
changing the display state of the image.

* * * * *